Dec. 4, 1934.  N. LEE  1,983,474
AUTOMATIC BRAKE MECHANISM FOR TRAILERS
Filed April 10, 1933   3 Sheets-Sheet 1
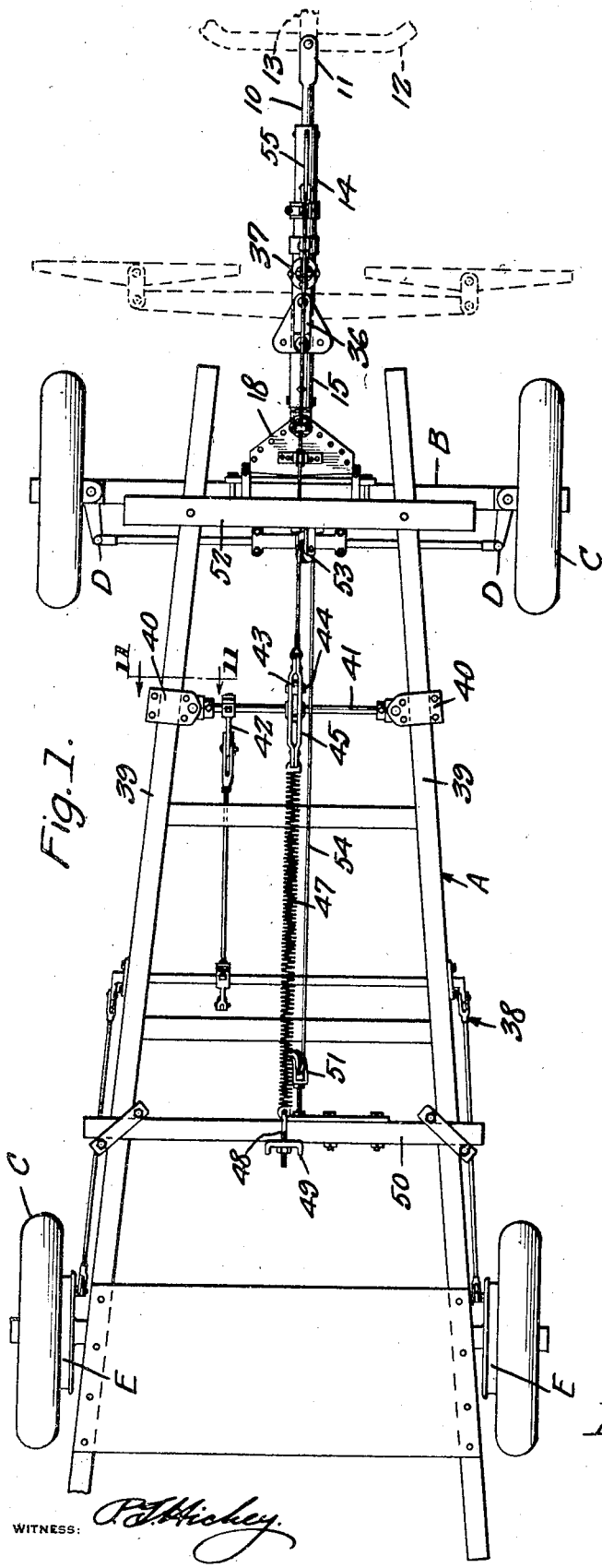
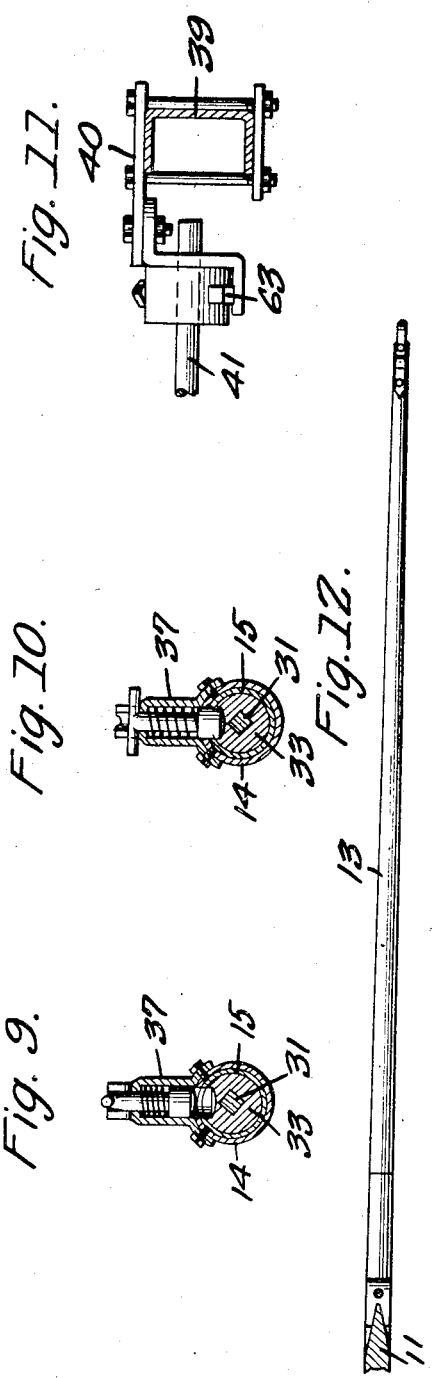
Norman Lee,
INVENTOR
BY Victor J. Evans & Co.
ATTORNEY
WITNESS: P. T. Hickey

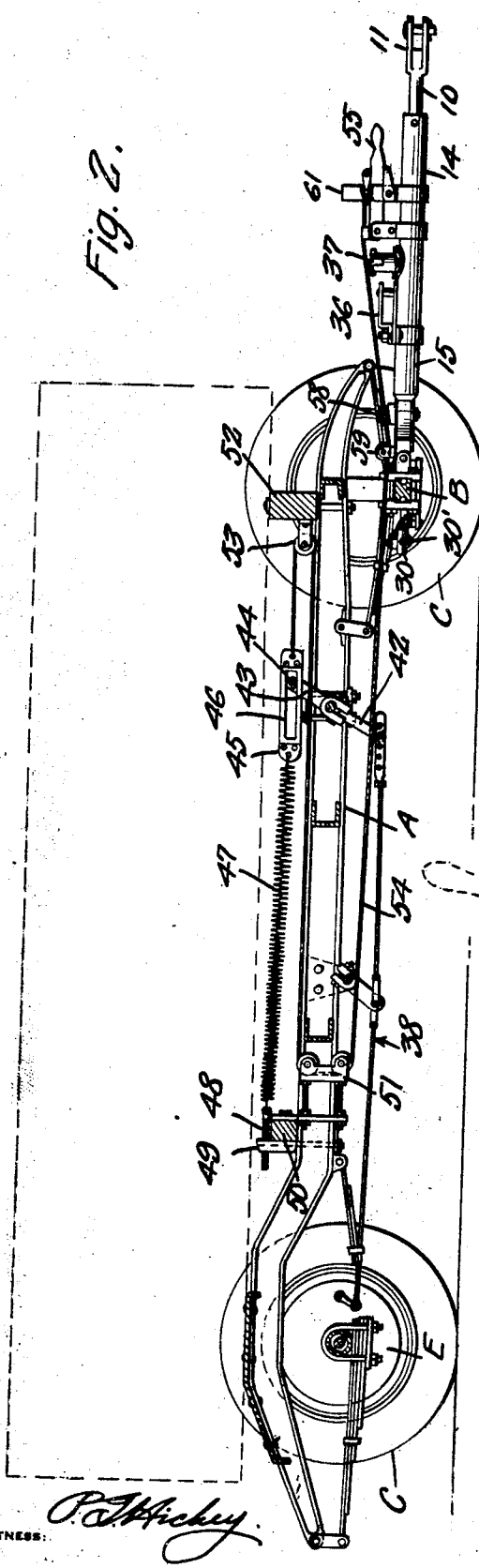

Dec. 4, 1934.  N. LEE  1,983,474
AUTOMATIC BRAKE MECHANISM FOR TRAILERS
Filed April 10, 1933  3 Sheets-Sheet 3
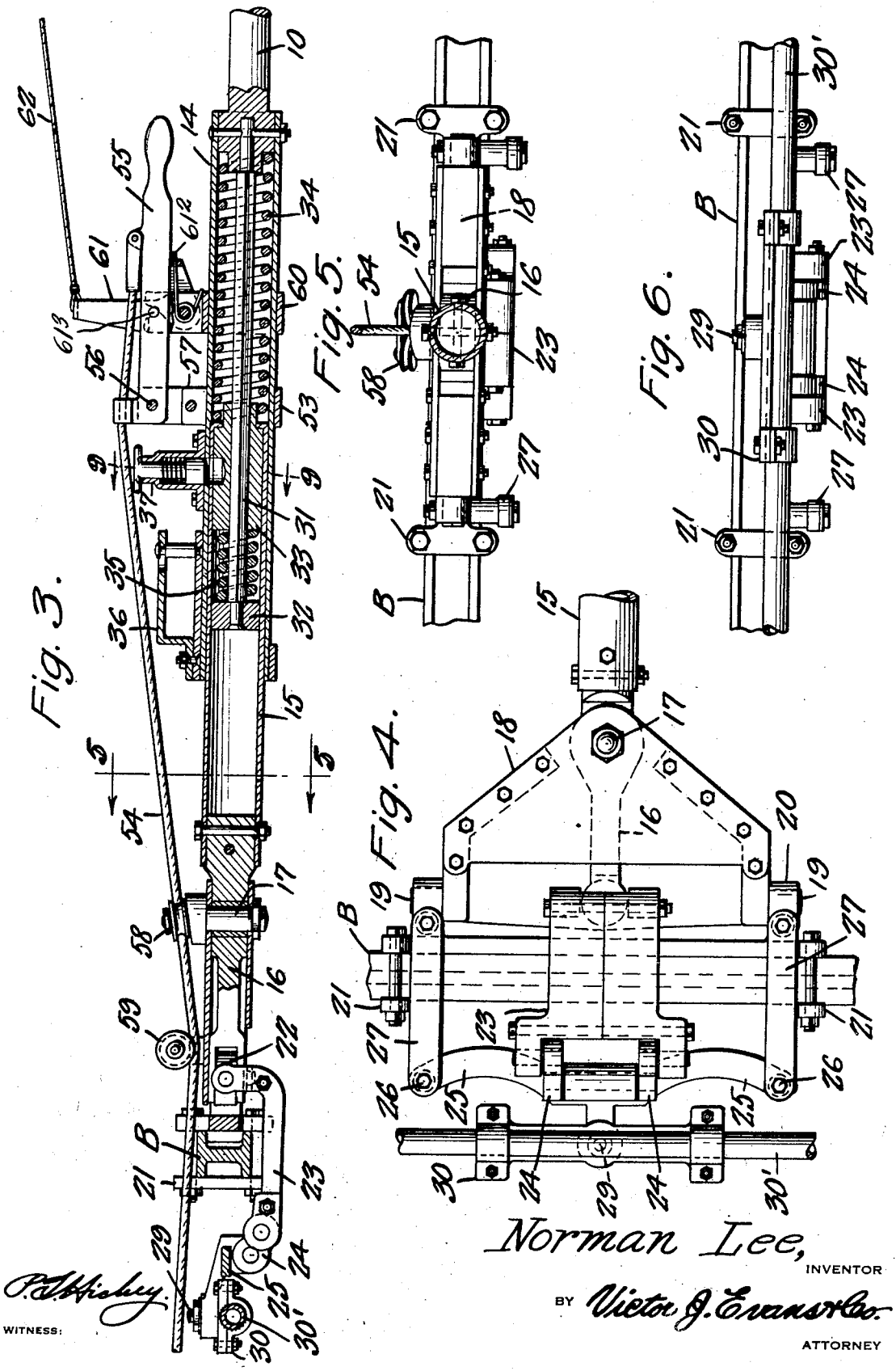
Norman Lee, INVENTOR
BY Victor J. Evans & Co.
ATTORNEY Patented Dec. 4, 1934

1,983,474

UNITED STATES PATENT OFFICE 1,983,474

AUTOMATIC BRAKE MECHANISM FOR TRAILERS

Norman Lee, Volin, S. Dak., assignor of one-half to Thomas H. Greear, Volin, S. Dak.

Application April 10, 1933, Serial No. 665,424

5 Claims. (Cl. 188—112)

The invention relates to brake mechanism for trailers and more especially to a combined hitch and automatic brake mechanism for trailer vehicles.

The primary object of the invention is the provision of mechanism of this character, wherein trailer vehicles, when running ahead of the draft thereof, assures the automatic action of the mechanism for the operation of the brakes to the vehicle so as to avoid damage or injury resultant should the trailer vehicle be devoid of automatically controlled brake mechanism and in this manner complete control is had with the trailer wheel under draft.

Another object of the invention is the provision of mechanism of this character, wherein the brakes of the trailer vehicle can be locked on should the vehicle be at a standstill and on an incline and also such mechanism will be automatically operated on the overrun of the draft of such vehicle, particularly when traveling upon an incline and such mechanism is independent of the braking mechanism of the draft vehicle if it be of the motor driven type or horse drawn.

A further object of the invention is the provision of mechanism of this character, wherein in the assembly of the brake mechanism for the trailer vehicle, provision is had for the manual setting of such mechanism and the automatic control thereof, as well as take-up to avoid any slack in the working of such mechanism.

A still further object of the invention is the provision of mechanism of this character which is comparatively simple in construction, thoroughly reliable and efficient in its operation, automatic in action, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a plan view of a trailer vehicle showing the brake mechanism constructed in accordance with the invention applied thereto with the hitch of said trailer vehicle shown by dotted lines connected with the draft therefor.

Figure 2 is a vertical longitudinal sectional view through the vehicle.

Figure 3 is an enlarged sectional view through the draw rigging between the draft and the trailer vehicle.

Figure 4 is a fragmentary plan view looking toward the underside of such rigging.

Figure 5 is a sectional view on the line 5—5 of Figure 3 looking in the direction of the arrows.

Figure 6 is a rear end view of such rigging.

Figure 7 is a detail fragmentary side elevation of the brake setting and releasing lever of said mechanism, showing by full lines the lever in setting position and by dotted lines in released position.

Figure 8 is a sectional view on the line 8—8 of Figure 7 looking in the direction of the arrows.

Figure 9 is a sectional view on the line 9—9 of Figure 3 showing the locking means in normal released position.

Figure 10 is a view similar to Figure 9 showing the locking means in locking position.

Figure 11 is a sectional view on the line 11—11 of Figure 1 looking in the direction of the arrows.

Figure 12 is a fragmentary top plan view of a draft pole.

Similar reference characters indicate corresponding parts throughout the several views in the drawings.

Referring to the drawings in detail, A designates generally the chassis of the trailer vehicle, B the front stationary axle, C the traction wheels, D the turning knuckles for the front guide wheels and E the rear wheel brakes, these being conventional.

The brake mechanism for the trailer vehicle comprises a draw bar 10 having the coupling end 11 for detachable connection with the hitch 12 of a draft vehicle or a draft pole or tongue 13, the latter serving for the hitch of draft animals. The draw bar 10 is joined with a tubular extension 14 therefor which slidably telescopes over the tubular extension 15 of the draft rigging for the trailer vehicle. This extension 15 is joined with a swinging coupling 16 which swings horizontally upon a pivot 17 mounted centrally of a vertically swinging support 18 having lateral pivot trunnions 19 engaged in hangers 20, which, through the clips 21, are made secure upon the front stationary axle B of the vehicle, the support 18 being located at the center of said axle.

The coupling 16 at its rearmost end, through the medium of a universal joint 22, is connected through a series of pivotally connected links 23 and 24 with a shiftable coupling 25 pivoted at 26 to laterally swinging hangers 27, these pivoted at 28 to the hangers 20. This coupling 25 centrally thereof is pivoted at 29 to a clamp 30 engaged with the cross connecting or tie rod 30' joining the turning knuckles D for the front guide wheels of the vehicle so that when the draw bar 10 is shifted in the turning of the draft medium for the trailer vehicle the front wheels C thereof will be correspondingly turned for the guiding of such trailer vehicle.

Arranged interiorly of the tubular extensions 14 and 15 and made secure to the draw bar 10 is a plunger rod 31 carrying a piston head 32 operative in the tubular extension 15, the latter being fitted with a stationary guide plug 33 through which works the plunger rod 31. At opposite sides of this plug 33 are arranged the tensioning springs 34 and 35 respectively, these being housed by the said tubular extensions 14 and 15, the spring 34 being compressed by the pressure of the draw bar 10 thereon, while the spring 35 is compressed by the pressure of the piston 32 thereon, these springs being seated against the plug 33 in the tubular extension 15 as will be apparent from Figure 3 of the drawings. It will be apparent that spring 34, which is stronger than spring 35, automatically extends the draw bar after contraction of the latter.

The extension 14 has mounted thereon a hitch 36 for a double tree for draft animals and under such draft the pole 13 is coupled with the draw bar 10 as should be apparent.

The tubular extension 14 has mounted thereon a hand releasable latching device 37 to engage with the tubular extension 15 so as to lock these telescopically engaged extensions 14 and 15 against relative sliding movement for a purpose subsequently described.

Suitably mounted upon the chassis A of the trailer vehicle is a braking rigging 38 connected with the rear wheel brakes E and this rigging may be of any approved construction. On the side sills 39 of the chassis A of the trailer vehicle are mounted hangers 40 for a rocking shaft 41, which, through the arm 42 thereof, is adjustably connected with the rigging 38. The shaft 41 carries a throw lever 43 having the cross pin 44 working in a throw yoke 45, the same being provided in each side cheek with the elongated slot 46 for the cross pin 44 of the lever 43. This yoke at its rearmost end has connected therewith a coiled tensioning spring 47 which is also connected with an adjuster 48 having the mounting 49 upon a cross beam 50 carried by the chassis A. This adjuster 48 permits the varying of the tensioning action of the spring 47.

The cross beam 50 has adjustably mounted thereon a double pulley 51 and to a forwardly fixed cross beam 52 is a single pulley 53, while trained about these pulleys 51 and 53 is a pulley cable 54, one end being connected to the yoke 45 and the other end connected to a setting lever 55 pivoted at 56 for swinging movement in a bracket 57 upon the tubular extension 14, the cable 54 being also trained upon the guide pulleys 58 and 59 respectively of the draft rigging so as to eliminate any interference in the free movement of the cable 54 when slackened or pulled upon.

Close to the bracket 57 and carried by the tubular extension 14 of the draw bar 10 is a mounting 60 for a spring tensioned latch 61 for the setting lever 55 so that when the lever is swung to make taut the cable 54, which is the set condition thereof for the automatic operation of the brake mechanism for the trailer vehicle, the latch 61 will engage said lever 55 to hold it in this position. This latch 61 has connected therewith a releasing cable 62 which extends in convenient reach of the draft vehicle for the trailer vehicle or for manual control whereby the cable 54 can become slack on the freeing of the setting lever 55 by said latch 61.

This latch 61 is pivoted at 61' for rocking motion and is urged to latching position by the spring $61^2$ and engages a lug $61^3$ on the lever 55 when in latching position.

When the setting lever 55 is in upright position the cable 54 is slack and thus the brake rigging on the trailer vehicle is ineffective for the operation of the brakes E of said vehicle. When the setting lever 55 is in upright position the cable 54 is slack and thus the brake rigging 38 on the trailer vehicle is ineffective for the operation of the brakes E of said vehicle. When the setting lever 55 is swung forwardly from a vertical to a horizontal position, in this position it being locked by the latch 61 which is pivoted at 61' for rocking motion and is urged to latching position by the spring $61^2$ for engaging a lug $61^3$ on the said lever 55, the cable 54 will be rendered taut. When the cable 54 is rendered taut, the spring 47 is put under tension and the yoke 45 will have been moved forwardly and likewise the lever 42 will have moved clockwise, placing the pin 44 of the same at the forward end of the slot 46 in said yoke. Now, in this position of the parts, the rigging 38 of the brake mechanism is effective so that when the cable is slackened the said rigging will operate for the application of the brakes E on an overrun of the trailer vehicle relative to the draft thereof, because when this overrun takes place the draw bar 10 operates counter to the movement of the tubular extension 15 of the draft rigging. This extension slides inwardly of the extension 14 of the draw bar 10 and by so doing, the cable 54 will slacken, it being trained about the pulleys 51, 53, 58 and 59 and under the contraction of the spring 47 the yoke 45 will be moved rearwardly, causing the lever 43 to rock counterclockwise for actuating the brake rigging 38 for the application of the rear wheel brakes E, as should be obvious. It is, of course, understood that when the yoke 45 is moved forwardly, clockwise movement of the lever 43 takes place due to the spring equipment of the brake rigging 38 and thus the cross pin 44 of said lever will be arrested at the forward end of the slot 36 in said yoke, so that any rearward movement of the latter will naturally apply the brakes, as before described.

When the overrun of the trailer vehicle with respect to the draft is relieved the rear wheel brakes E of said trailer vehicle will be automatically released.

When it is desired to lock the telescoped tubular extensions 14 and 15 against relative movement the lock 37 is manually moved for this purpose and when the set lever 55 is freed from the latch it can be manually thrown to apply and release the rear wheel brakes E of the trailer vehicle and in this instance normally the rear wheel brakes E will be applied, it being necessary to swing the lever for a release thereof.

The shaft 41 has adjustably secured thereto stops 63, these coacting with the hangers 40 to limit the rocking of said shaft 41 in one direction. The stops 63 are adapted to contact with the hangers 40 when the cable 54 has been rendered taut and under tension of the spring 47 the yoke 46 then will have been shifted forwardly of the vehicle. The lever 43, when the yoke is forward, has its cross pin 44 foremost in the slots 46 in this yoke so that when the vehicle overruns the draft the brake rigging 38 will be automatically operated upon for the applying of the brakes E of said vehicle as heretofore explained.

It is to be understood that while there has been described in detail a certain aggroupment of parts and the mounting of these with a vehicle, the arrangement and mounting of the mechanism can be altered or changed as the occasion may require and as properly come within the scope of the appended claims without departing from the spirit of the invention or sacrificing any of its advantages.

What is claimed is:

1. In a trailer vehicle having brakes, a normally extended contractible draw bar mounted at the front end of the vehicle, universal connection between the draw bar and steering equipment of said vehicle for the guiding thereof on the swinging of the draw bar, brake rigging on the vehicle and operative with the brakes, tensioned flexible connections between the brake rigging and the draw bar and operated on contraction of the latter for the automatic application of the brakes, means for locking the draw bar against contraction and manually controlled, and means for rendering the flexible connection either slack or taut.

2. In a trailer vehicle having brakes, a normally extended contractible draw bar mounted at the front end of the vehicle, universal connection between the draw bar and steering equipment of said vehicle for the guiding thereof on the swinging of the draw bar, brake rigging on the vehicle and operative with the brakes, tensioned flexible connections between the brake rigging and the draw bar and operated on contraction of the latter for the automatic application of the brakes, means for locking the draw bar against contraction and manually controlled, means for rendering the flexible connection either slack or taut, and means for latching the last named means when in position for rendering the flexible connection taut.

3. In a trailer vehicle having brakes, a normally extended contractible draw bar mounted at the front end of the vehicle, universal connection between the draw bar and steering equipment of said vehicle for the guiding thereof on the swinging of the draw bar, brake rigging on the vehicle and operative with the brakes, tensioned flexible connections between the brake rigging and the draw bar and operated on contraction of the latter for the automatic application of the brakes, means for locking the draw bar against contraction and manually controlled, means for rendering the flexible connection either slack or taut, means for latching the last named means when in position for rendering the flexible connection taut, and tensioned cushioning means arranged in the draw bar for automatically extending the same after contraction.

4. In a trailer vehicle having brakes, a normally extended contractible draw bar mounted at the front end of the vehicle, universal connection between the draw bar and steering equipment of said vehicle for the guiding thereof on the swinging of the draw bar, brake rigging on the vehicle and operative with the brakes, tensioned flexible connections between the brake rigging and the draw bar and operated on contraction of the latter for the automatic application of the brakes, means for locking the draw bar against contraction and manually controlled, means for rendering the flexible connection either slack or taut, means for latching the last named means when in position for rendering the flexible connection taut, tensioned cushioning means arranged in the draw bar for automatically extending the same after contraction, and means for guiding the flexible connection when being rendered taut.

5. In a trailer vehicle having brakes, a normally extended contractible draw bar mounted at the front end of the vehicle, universal connection between the draw bar and steering equipment of said vehicle for the guiding thereof on the swinging of the draw bar, brake rigging on the vehicle and operative with the brakes, tensioned flexible connections between the brake rigging and the draw bar and operated on contraction of the latter for the automatic application of the brakes, means for locking the draw bar against contraction and manually controlled, means for rendering the flexible connection either slack or taut, means for latching the last named means when in position for rendering the flexible connection taut, tensioned cushioning means arranged in the draw bar for automatically extending the same after contraction, means for guiding the flexible connection when being rendered taut, and means for varying the tension on the flexible member.

NORMAN LEE.